US012292905B2

United States Patent
Sun et al.

(10) Patent No.: US 12,292,905 B2
(45) Date of Patent: May 6, 2025

(54) MULTI-TURN DIALOGUE SYSTEM AND METHOD BASED ON RETRIEVAL

(71) Applicant: BEIJING UNIVERSITY OF POSTS AND TELECOMMUNICATIONS, Beijing (CN)

(72) Inventors: Haifeng Sun, Beijing (CN); Zirui Zhuang, Beijing (CN); Bing Ma, Beijing (CN); Jingyu Wang, Beijing (CN); Cheng Zhang, Beijing (CN); Tong Xu, Beijing (CN); Jing Wang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 159 days.

(21) Appl. No.: 18/095,196

(22) Filed: Jan. 10, 2023

(65) Prior Publication Data
US 2023/0401243 A1 Dec. 14, 2023

(30) Foreign Application Priority Data
Jun. 9, 2022 (CN) .......................... 202210649202.3

(51) Int. Cl.
| G06F 17/00 | (2019.01) |
| G06F 16/3329 | (2025.01) |
| G06F 16/334 | (2025.01) |
| G06N 3/08 | (2023.01) |

(52) U.S. Cl.
CPC ...... *G06F 16/3329* (2019.01); *G06F 16/3344* (2019.01); *G06F 16/3347* (2019.01); *G06N 3/08* (2013.01)

(58) Field of Classification Search
CPC ............. G06F 16/3329; G06F 16/3344; G06F 16/3347; G06N 3/08; G06N 3/044; G06N 3/045; Y02D 10/00
See application file for complete search history.

(56) References Cited

U.S. PATENT DOCUMENTS 10,832,667 B2 * 11/2020 Kotti ...................... G10L 15/22
10,860,629 B1 * 12/2020 Gangadharaiah ... G06F 16/3329
(Continued)

FOREIGN PATENT DOCUMENTS

| CN | 108829662 A | 11/2018 |
| CN | 110299140 A | 10/2019 |

(Continued)

OTHER PUBLICATIONS

Wu, Yu, et al. "Sequential matching network: A new architecture for multi-turn response selection in retrieval-based chatbots." arXiv preprint arXiv:1612.01627, 10 pages, May (Year: 2016).*

(Continued)

*Primary Examiner* — Greta L Robinson
(74) *Attorney, Agent, or Firm* — Burr & Forman LLP

(57) ABSTRACT

The multi-turn dialogue system based on retrieval includes the following modules: a representation module, a matching module, an aggregation module and a prediction module; the multi-turn dialogue method based on retrieval includes the following steps: (1) by a representation module, converting each turn of dialogue into a cascade vector of the dialogue, and converting a candidate answer into a cascade vector of the candidate answer; (2) by a matching module, dynamically absorbing context information based on a global attention mechanism, and calculating a matching vector; (3) by aggregation module, obtaining a short-term dependence information sequence and a long-term dependence information sequence; (4) by a prediction module, calculating the matching score of the context and candidate answer involved in the matching; (5) selecting a candidate answer with the highest matching score as a correct answer.

1 Claim, 2 Drawing Sheets

(56) References Cited

U.S. PATENT DOCUMENTS

| | | | |
|---|---|---|---|
| 11,132,994 B1 | 9/2021 | Zhou et al. | |
| 11,238,234 B2* | 2/2022 | Jiang | G06F 40/30 |
| 11,562,147 B2* | 1/2023 | Wang | G06F 18/21 |
| 11,941,366 B2* | 3/2024 | Shao | G06N 3/045 |
| 2019/0355270 A1 | 11/2019 | McCann et al. | |

FOREIGN PATENT DOCUMENTS

| | | |
|---|---|---|
| CN | 110851575 A | 2/2020 |
| CN | 111353029 A | 6/2020 |
| CN | 112818105 A | 5/2021 |
| CN | 113901188 A | 1/2022 |
| CN | 114391143 A | 4/2022 |

OTHER PUBLICATIONS

Lowe, Ryan, et al. "The ubuntu dialogue corpus: A large dataset for research in unstructured multi-turn dialogue systems." arXiv preprint arXiv:1506.08909, 10 pages, Feb. 2015.*

Gu, Jia-Chen, et al. "Speaker-aware BERT for multi-turn response selection in retrieval-based chatbots." Proceedings of the 29th ACM International Conference on Information & Knowledge Management. 4 pages, Oct. 2020.*

Zhang, Zhuosheng, et al. "Modeling multi-turn conversation with deep utterance aggregation." arXiv preprint arXiv:1806.09102 13 pages, Nov. 2018.*

Zhiqiang Ma, et al.,An Emotion Guidance Decision-Making Model Based on Dialogue Context, 2021 IEEE 23rd Int Conf on High Performance Computing & Communications; 7th Int Conf on Data Science & Systems; 19th Int Conf on Smart City; 7th Int Conf on Dependability in Sensor, Cloud & Big Data Systems & Application, pp. 1163-1170.

Yan, et al., Knowledge-Based Systems, Response Selection from Unstructured Documents for Human-Computer Conversation Systems, 2018, pp. 149-159.

Liang, et al., The Method for Identifying the Conversation Responding Relationships using Graph Representation Learning, Journal of Cyber Security, Sep. 2021, vol. 6, No. 5, pp. 199-214.

* cited by examiner

MULTI-TURN DIALOGUE SYSTEM AND METHOD BASED ON RETRIEVAL

CROSS-REFERENCE TO RELATED APPLICATION

The present application claims the priority to a Chinese Patent Application No. 202210649202.3, filed with the China National Intellectual Property Administration on Jun. 9, 2022 and entitled "Multi-turn dialogue system and method based on retrieval", which is incorporated herein by reference in its entirety.

TECHNICAL FIELD

The present application relates to a multi-turn dialogue system and method based on retrieval, belonging to the technical field of natural language processing, in particular to the technical field of dialogue robot.

BACKGROUND

It is a challenging task in the field of artificial intelligence to create a robot that can communicate naturally with humans in the open field. At present, there are two methods to build such a dialogue robot, i.e., a generative-based method and a retrieval-based method. The generative-based method directly generates a reply based on a language model trained on a large-scale dialogue data set, while the retrieval-based method selects a best matched reply from a candidate set.

The task of the dialogue robot based on retrieval is: given a candidate set consisting of the first n turns of dialogue and several candidate answers, the model is required to select a dialogue that is most suitable for the n+1-th turn of dialogue from the candidate set, which is an important and quite challenging task. A core step of this task is to calculate a matching score of n turns of dialogues (i.e. context) and candidate answers. Some early methods were to aggregate n turns of dialogues into a dense vector through a recurrent neural network, and then calculate a cosine similarity between candidate answer representation and the dense vector, so as to select a candidate answer with the highest score as the answer. In order to avoid the loss of context information, Wu et al. proposed an SMN model (see the literature: Wu Y, Wu W, Xing C, et al Sequential Matching Network: A New Architecture for Multi-turn Response Selection in Retrieval-Based Chatbots[C]; proceedings of the Proceedings of the 55th Annual Meeting of the Association for Computational Linguistics, ACL 2017, Vancouver, Canada, July 30-August 4, Volume 1: Long Papers, F, 2017. Association for Computational Linguistics.), which matches the candidate answers with each turn of dialogue to obtain a matching vector, and then aggregates the n matching vectors in time sequence through the recurrent neural network RNN, and then calculates a score with the aggregated vector. Later, a lot of work continued this way. However, these work have neglected that the context information in the matching phase is very important.

The method of Gu et al. (see the literature: Gu J, Li T, Liu Q, et al. Speaker-Aware BERT for Multi-Turn Response Selection in Retrieval-Based Chatbots[C]; proceedings of the CIKM, F, 2020.) considers the problem of global information participating in interaction, but their method simply compresses the entire dialogue context and matches candidate answers to achieve the purpose of global information participating in interaction. The matching granularity of this method is too coarse, and the compression of too long dialogue into a dense vector will lose a lot of information and may introduce noise.

In summary, how to effectively use dialogue context information to improve the matching accuracy of dialogue candidate answers has become an urgent technical problem in the technical field of dialogue robot.

SUMMARY

In view of this, the present invention aims to invent a system and method based on retrieval, which can dynamically absorb the context information in the matching process of dialogue-candidate answer, and improve the matching accuracy of dialogue-candidate answer.

In order to achieve the above purpose, the present invention proposes a multi-turn dialogue system based on retrieval, which includes the following modules:

a representation module, configured to represent each turn of dialogue as a cascade vector $E_u$ of a word level vector and a character level vector; represent a candidate answer r as a cascade vector $E_r$ of a word level vector and a character level vector;

a matching module, formed by stacking L global interaction layers of IOI models, and configured to take the cascade vector of the dialogue and the cascade vector of the candidate answer output by the representation module as an input, dynamically absorb context information based on a global attention mechanism, and recursively calculate a k-th layer self-attention dialogue representation $\hat{U}^k$, a k-th layer self-attention candidate answer representation $\hat{R}^k$, a k-th layer mutual attention dialogue representation $\overline{U}^k$, a k-th mutual attention candidate answer representation $\overline{R}^k$, a k-th layer dialogue synthesis representation $U^k$, and a k-th layer candidate answer synthesis representation $R^k$, by the following formulas, to obtain a matching vector $(v_1, \ldots, v_1)$:

$$\hat{U}^k = f_{catt}(U^{k-1}, U^{k-1}, C)$$

$$\hat{R}^k = f_{catt}(R^{k-1}, R^{k-1}, C)$$

$$\overline{U}^k = f_{catt}(U^{k-1}, R^{k-1}, C)$$

$$\overline{R}^k = f_{catt}(R^{k-1}, U^{k-1}, C)$$

$$\tilde{U}^k = [U^{k-1}, \hat{U}^k, \overline{U}^k, U^{k-1} \odot \overline{U}^k]$$

$$\tilde{R}^k = [R^{k-1}, \hat{R}^k, \overline{R}^k, R^{k-1} \odot \overline{R}^k]$$

$$U^k = \max(0, W_h \tilde{U}^{k-1} + b_h)$$

$$R^k = \max(0, W_h \tilde{R}^{k-1} + b_h) + R^{k-1}$$

In the formulas, $U^{k-1} \in \mathbb{R}^{m \times d}$ and $R^{k-1} \in \mathbb{R}^{n \times d}$ represent inputs of a k-th global interaction layer, wherein m and n represent the number of words contained in a current turn of dialogue and the number of words contained in the candidate answer, respectively, and inputs of a first global interaction layer are $U^0 = E_u$, $R^0 = E_r$; $W_h \in \mathbb{R}^{4d \times d}$ and $b_h$ are training parameters; an operator $\odot$ represents a multiplication of elements; d represents the dimension of a vector;

$C \in \mathbb{R}^{l_c \times d}$ represents context obtained by cascading contents of all l turns of dialogue, all l turns of dialogues contain $l_c$ words, C can be obtained by cascading word level vectors of the $l_c$ words;

In the formulas, $f_{catt}()$ represents the global attention mechanism, which is specifically defined as follows:

$$f_{catt}(Q, K, C) = \tilde{Q} + FNN(\tilde{Q})$$

where, $FNN(\tilde{Q})=\max(0,\tilde{Q}W_f+b_f)W_g+b_g$, $W_{\{f,g\}} \in \mathbb{R}^{d \times d}$ and $b_{\{f,g\}}$ are trainable parameters, $Q$ and $\tilde{Q}$ are mixed using a residual connection to obtain $\hat{Q}$, wherein $\hat{Q}$ is calculated according to the following formula:

$$\hat{Q}=S(Q,K,C) \cdot K$$

where, $Q \in \mathbb{R}^{n_q \times d}$ represents a query sequence, $K \in \mathbb{R}^{n_k \times d}$ represents a key sequence, wherein $n_q$ and $n_k$ represent the number of words, $S(Q,K,C) \in \mathbb{R}^{n_q \times n_k}$ represents a similarity of $Q$ and $K$ in the context $C$; $S(Q, K, C)$ is calculated according to the following formula:

$$S(Q,K,C)_{i,j} = \frac{\exp(e_{i,j})}{\sum_{k=1}^{n_k} e_{i,k}}$$

$$e_{i,j} = W_b \tanh\left(W_c Q_i + W_d K_j + W_e \frac{C_i^q + C_j^k}{2}\right)$$

where, $W_{\{b,c,d,e\}}$ are trainable parameters, $C_i^q$ represents an i-th row of $C^q$, and its physical meaning is fusion context information related to an i-th word in the query sequence Q; $C_j^k$ represents a j-th row of $C^k$, and its physical meaning is fusion context information related to a j-th word of the key sequence K;
$C_q \in \mathbb{R}^{n_q \times d}$ and $C^k \in \mathbb{R}^{n_k \times d}$ represent context information compression vector fusing the query vector Q and context information compression vector fusing the key vector K, respectively, and are calculated according to the following formulas:

$$C^q = \text{softmax}(QW_2 C^T) \cdot C$$

$$C^k = \text{softmax}(KW_2 C^T) \cdot C$$

$W_2 \in \mathbb{R}^{d \times d}$ are training parameters; and
extract a d dimension matching vector $v_i$ from a matching image $M_i$ of an i-th turn of dialogue by a convolutional neural network, and matching vectors from the first to the l-th turn by a convolutional neural network are represented by $(v_1, \ldots, v_l)$; the matching image $M_i$ of the i-th turn of dialogue is calculated according to the following formula:

$$M_i = M_{i,self} | M_{i,interaction} \oplus M_{i,enhanced}$$

where, $M_i \in \mathbb{R}^{m_i \times n \times 3}$, $\oplus$ is a cascading operation, $m_i$ is the number of words contained in the i-th turn of dialogue $u_i$; $M_{i,self}$, $M_{i,interaction}$ and $M_{i,enhanced}$ are calculated according to the following formulas:

$$M_{i,self} = \frac{\hat{U}_i^L \cdot (\hat{R}^L)^\top}{\sqrt{d}}$$

$$M_{i,interaction} = \frac{\overline{U}_i^L \cdot (\overline{R}^L)^\top}{\sqrt{d}}$$

$$M_{i,enhanced} = \frac{U_i^L \cdot (R^L)^\top}{\sqrt{d}}$$

an aggregation module composed of one RNN network and one Transformer network, and configured to: receive the matching vector $(v_1, \ldots, v_l)$ output by the matching module, process the matching vector by the RNN network to obtain a short-term dependence information sequence $(h_1, \ldots, h_l)$, and process the matching vector by the Transformer network to obtain a long-term dependence information sequence $(g_1, \ldots, g_l)$;
a prediction module: configured to calculate a matching score of the context c and the candidate answer r involved in the matching according to the short-term dependence information sequence $(h_1, \ldots, h_l)$ and long-term dependence information sequence $(g_1, \ldots, g_l)$ output by the aggregation module.

The word level vector in the representation module is obtained by a tool Word2vec; the character level vector is obtained by encoding character information through the convolutional neural network.

The specific calculation process of the short-term dependence information sequence $(h_1, \ldots, h_l)$ is:
obtaining l hidden layer state vectors by processing the matching vector $(v_1, \ldots, v_l)$ through a GRU model, wherein an i-th hidden layer state is:

$$h_i = GRU(v_i, h_{i-1})$$

where, $h_0$ is initialized randomly.
The specific calculation process of the long-term dependence information sequence $(g_1, \ldots, g_l)$ is:

$$(g_1, \ldots, g_l) = \text{MultiHead}(Q,K,V)$$

where, $$Q = V_m W^Q, K = V_m W_K, V = V_m W^V,$$

where, $W^Q$, $W^K$ and $W^V$ are training parameters; Multi-head ( ) represents a multi-head attention function; $V_m = (v_1, \ldots, v_l)$.

The specific process of the prediction module to calculate a matching score of the context c and the candidate answer r involved in matching is calculated as follows:
calculating $$\hat{g}_i = \max\left(0, W\left[\begin{array}{c}(g_i - h_i) \odot (g_i - h_i) \\ g_i \odot h_i\end{array}\right] + b\right)$$

to obtain $(\hat{g}_1, \ldots, \hat{g}_l)$, wherein $\odot$ represents the multiplication of elements;
then inputting $(\hat{g}_1, \ldots, \hat{g}_l)$ into a GRU model, to obtain:

$$\tilde{g}_i = GRU(\hat{g}_i, \tilde{g}_{i-1})$$

wherein $\tilde{g}_0$ is initialized randomly; a final hidden layer state of the GRU model is $\tilde{g}_l$; calculating the matching score of the context c and the candidate answer r involved in matching based on $\tilde{g}_l$:

$$g(c,r) = \sigma(\tilde{g}_l w_o + b_o)$$

In the above formula, $\sigma(\cdot)$ represents a sigmoid function, $w_o$ and $b_o$ are training parameters.
The system is trained using the following loss function:

$$L_{enhanced} = -\sum_L^{k=1} \sum_N^{i=1} [y_i \log(g^k(c_i, r_i)) + (1-y_i)\log(1 - g^k(c_i, r_i))]$$

where, $g^k(c_i, r_i)$ represents a matching score calculated by using an output $(U^k, R^k)$ of the k-th global interaction layer in the matching module for an i-th training sample $(c_i, r_i, y_i)$; $c_i$ represents a session of the i-th training sample, $r_i$ represents a candidate answer of the i-th training sample, $y_i$ represents a true matching result of the i-th training sample.

The present invention also proposes a multi-turn dialogue method based on retrieval, comprising:

(1) by a representation module, converting each turn of dialogue into a cascade vector $E_u$ of the dialogue, and converting a candidate answer r into a cascade vector $E_r$ of the candidate answer; the cascade vector $E_u$ of the dialogue is obtained by cascading a word level vector and a character level vector in the dialogue; the cascade vector $E_r$ of the candidate answer is obtained by cascading a word level vector and a character level vector in the candidate answer; the word level vector is obtained by a tool Word2vec; the character level vector is obtained by encoding character information through a convolutional neural network;

(2) by a matching module, taking the cascade vector of the dialogue and the cascade vector of the candidate answer output by the representation module as an input, dynamically absorbing context information based on a global attention mechanism, and recursively calculating a k-th layer self-attention dialogue representation $\hat{U}^k$, a k-th layer self-attention candidate answer representation $\hat{R}^k$, a k-th layer mutual attention dialogue representation $\overline{U}^k$, a k-th layer mutual attention candidate answer representation $\overline{R}^k$, a k-th layer dialogue synthesis representation $U^k$, and a k-th layer candidate answer synthesis representation $R^k$, by the following formulas, to obtain a matching vector $(v_1, \ldots, v_l)$:

$\hat{U}^k = f_{catt}(U^{k-1}, U^{k-1}, C)$ $\hat{R}^k = f_{catt}(R^{k-1}, R^{k-1}, C)$ $\overline{U}^k = f_{catt}(U^{k-1}, R^{k-1}, C)$ $\overline{R}^k = f_{catt}(R^{k-1}, U^{k-1}, C)$ $\tilde{U}^k = [U^{k-1}, \hat{U}^k, \overline{U}^k, U^{k-1} \odot \overline{U}^k]$ $\tilde{R}^k = [R^{k-1}, \hat{R}^k, \overline{R}^k, R^{k-1} \odot \overline{R}^k]$ $U^k = \max(0, W_h \tilde{U}^{k-1} + b_h)$ $R^k = \max(0, W_h \tilde{R}^{k-1} + b_h) + R^{k-1}$ in the formulas, $U_{k-1} \in \mathbb{R}^{m \times d}$ and $R^{k-1} \in \mathbb{R}^{n \times d}$ represent inputs of a k-th global interaction layer, wherein m and n represent the number of words contained in a current turn of dialogue and the number of words contained in the candidate answer, respectively, and inputs of a first global interaction layer is $U^0 = E_u$, $R^0 = E_r$; $W_h \in \mathbb{R}^{4d \times d}$ and $b_h$ are training parameters; the operator $\odot$ represents a multiplication of elements; d represents the dimension of a vector;

$C \in \mathbb{R}^{l_c \times d}$ represents context obtained by cascading contents of all l turns of dialogues, all l turns of dialogues contain $l_c$ words, C can be obtained by cascading word level vectors of the $l_c$ words;

in the formulas, $f_{catt}(\ )$ represents the global attention mechanism, which is specifically defined as follows:

$f_{catt}(Q, K, C) = \tilde{Q} + FNN(\tilde{Q})$ where $FNN(\tilde{Q}) = \max(0, \tilde{Q}W_f + b_f)W_g + b_g$, $W_{\{f,g\}} \in \mathbb{R}^{d \times d}$ and $b_{\{f,g\}}$ are trainable parameters, Q and $\tilde{Q}$ are mixed using a residual connection to obtain $\tilde{Q}$, wherein $\hat{Q}$ is calculated according to the following formula:

$\hat{Q} = S(Q, K, C) \cdot K$ where, $Q \in \mathbb{R}^{n_q \times d}$ represents a query sequence, $K \in \mathbb{R}^{n_k \times d}$ represents a key sequence, wherein $n_q$ and $n_k$ represent the number of words, $S(Q, K, C) \in \mathbb{R}^{n_q \times n_k}$ represents a similarity of Q and K in the context C; S(Q, K, C) is calculated according to the following formula:

$$S(Q, K, C)_{i,j} = \frac{\exp(e_{i,j})}{\sum_{k=1}^{n_k} e_{i,k}}$$

$$e_{i,j} = W_b \tanh\left(W_c Q_i + W_d K_j + W_e \frac{C_i^q + C_j^k}{2}\right)$$

where, $W_{\{b,c,d,e\}}$ are trainable parameters, $C_i^q$ represents an i-th row of $C^q$, and its physical meaning is the fusion context information related to the i-th word in the query sequence Q; $C_j^k$ represents a j-th row of $C^k$, and its physical meaning is fusion context information related to a j-th word of the key sequence K;

$C_q \in \mathbb{R}^{n_q \times d}$ and $C_k \in \mathbb{R}^{n_k \times d}$ represent context information compression vector fusing the query vector Q and context information compression vector fusing the key vector K, respectively, and they are calculated according to the following formula:

$C^q = \text{softmax}(QW_a C^T) \cdot C$ $C^k = \text{softmax}(KW_a C^T) \cdot C$ $W_a \in \mathbb{R}^{d \times d}$ are training parameters; and extracting a d dimension matching vector $v_i$ from a matching image $M_i$ of the i-th turn of dialogue by a convolutional neural network, and matching vectors from the first to the l-th turn of dialogues are represented by $(v_1, \ldots, v_l)$; the matching image $M_i$ of the i-th turn of dialogue is calculated according to the following formula:

$M_i = M_{i,self} \oplus M_{i,interaction} \oplus M_{i,enhanced}$ where, $M_i \in \mathbb{R}^{m_i \times n_i \times 3}$, $\oplus$ is a cascading operation, $m_i$ is the number of words contained in the i-th turn of dialogue $u_i$; $M_{i,self}$, $M_{i,interaction}$ and $M_{i,enhanced}$ are calculated according to the following formulas:

$$M_{i,self} = \frac{\hat{U}_i^L \cdot (\hat{R}^L)^\top}{\sqrt{d}}$$

$$M_{i,interaction} = \frac{\overline{U}_i^L \cdot (\overline{R}^L)^\top}{\sqrt{d}}$$

$$M_{i,enhanced} = \frac{U_i^L \cdot (R^L)^\top}{\sqrt{d}}.$$

(3) receiving, by an aggregation module, the matching vector $(v_1, \ldots, v_l)$ output by the matching module, processing the matching vector by the RNN network of the aggregation module to obtain a short-term dependence information sequence $(h_1, \ldots, h_l)$, and processing the matching vector by the Transformer network of the aggregation module to obtain a long-term dependence information sequence $(g_1, \ldots, g_l)$;

wherein a specific calculation process of the short-term dependence information sequence $(h_1, \ldots, h_l)$ is:

obtaining/hidden layer state vectors by processing the matching vector $(v_1, \ldots, v_l)$ through a GRU model, wherein an i-th hidden layer state is:

$$h_i = GRU(v_i, h_{i-1})$$

where, $h_0$ is initialized randomly.
a specific calculation process of the long-term dependence information sequence $(g_1, \ldots, g_l)$ is:

$$(g_1, \ldots, g_l) = \text{MultiHead}(Q, K, V)$$

where, $$Q = V_m W^Q, K = V_m W^K, V = V_m W^V,$$

where $W^Q$, $W^K$ and $W^V$ are training parameters; u represents a multi-head attention function; $V_m = (V_1, \ldots, V_l)$.

(4) calculating, by a prediction module, a matching score of the context c and the candidate answer involved in matching according to the short-term dependence information sequence $(h_1, \ldots, h_l)$ and the long-term dependence information sequence $(g_1, \ldots, g_l)$ output by the aggregation module, wherein the calculating includes:
calculating $$\hat{g}_i = \max\left(0, W\begin{bmatrix}(g_i - h_i) \odot (g_i - h_i) \\ g_i \odot h_i\end{bmatrix} + b\right)$$

to obtain $(\hat{g}_1, \ldots, \hat{g}_l)$, wherein $\oplus$ represents the multiplication of elements;
then inputting $(\hat{g}_1, \ldots, \hat{g}_l)$ into a GRU model, to obtain:

$$\tilde{g}_i = GRU(\hat{g}_i, \tilde{g}_{i-1})$$

wherein $\tilde{g}_0$ is initialized randomly; a final hidden layer state of the GRU model is $\tilde{g}_l$;
calculating the matching score of the context c and the candidate answer r involved in matching based on $\tilde{g}_l$:

$$g(c, r) = \sigma(\tilde{g}_l \cdot w_o + b_o)$$

where, $\sigma(\cdot)$ represents a sigmoid function, $w_o$ and $b_o$ are training parameters.

(5) selecting a candidate answer with a highest matching score as a correct answer.

The beneficial effect of the present invention is that the system and method of the present invention extend a general attention mechanism to a global attention mechanism, and dynamically absorb the context information in the dialogue-candidate answer matching process. The system of the present invention can simultaneously capture the short-term dependence and long-term dependence of the matching information sequence, and effectively improve the matching accuracy of dialogue-candidate answer.

DETAILED DESCRIPTION

In order to make the purpose, technical solutions and advantages of the present invention more clear, the present invention is further described in detail below in combination with the drawings.

Figure 1:
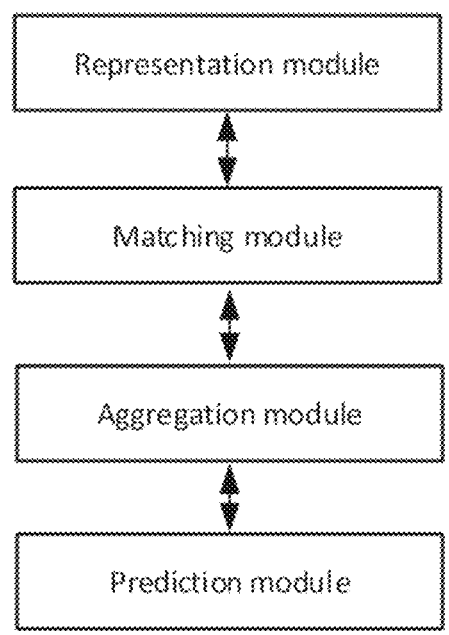
FIG. 1 is a module diagram of a multi-turn dialogue retrieval-based system proposed by the present invention.

Referring to FIG. 1, a multi-turn dialogue system based on retrieval proposed by the present invention is introduced. The system includes the following modules:
a representation module, configured to represent each turn of dialogue as a cascade vector $E_u = [e_{u,1}, \ldots, e_{u,m}]$ of a word level vector and a character level vector; to represent a candidate answer r as a cascade vector $[e_{r,1}, \ldots, e_{r,u}]$ of a word level vector and a character level vector;
a matching module, formed by stacking L (in this embodiment, L takes the value of 4) global interaction layers of IOI models (For details of IOI model, see Tao C, Wu W, Xu C, et al. One Time of Interaction May Not Be Enough: Go Deep with an Interaction-over-Interaction Network for Response Selection in Dialogues[C]; proceedings of the ACL, F, 2019.), and configured to take the cascade vector of the dialogue and the cascade vector of the candidate answer output by the representation module as an input, dynamically absorb context information based on a global attention mechanism, and recursively calculate a k-th layer self-attention dialogue representation $\hat{U}^k$, a k-th layer self-attention candidate answer representation $\hat{R}^k$, a k-th layer mutual attention dialogue representation $\overline{U}^k$, a k-th layer mutual attention candidate answer representation $\overline{R}^k$, a k-th layer dialogue synthesis representation $U^k$, and a k-th layer candidate answer synthesis representation $R^k$, to obtain a matching vector $(v_1, \ldots, v_l)$.

The attention mechanism is the basis of the global interaction layer. For details of attention mechanism, see Vaswani A, Shazeer N, Parmar N, et al. Attention is All you Need[C]; proceedings of the NIPS, F, 2017.

The specific calculation process is as follows:

$$\hat{U}^k = f_{catt}(U^{k-1}, U^{k-1}, C)$$

$$\hat{R}^k = f_{catt}(R^{k-1}, R^{k-1}, C)$$

$$\overline{U}^k = f_{catt}(U^{k-1}, R^{k-1}, C)$$

$$\overline{R}^k = f_{catt}(R^{k-1}, U^{k-1}, C)$$

$$\tilde{U}^k = [U^{k-1}, \hat{U}^k, \overline{U}^k, U^{k-1} \odot \overline{U}^k]$$

$$\tilde{R}^k = [R^{k-1}, \hat{R}^k, \overline{R}^k, R^{k-1} \odot \overline{R}^k]$$

$$U^k = \max(0, W_h \tilde{U}^{k-1} + b_h)$$

$$R^k = \max(0, W_h \tilde{R}^{k-1} + b_h) + R^{k-1}$$

In the above formulas, $U^{k-1} \in \mathbb{R}^{m \times d}$ and $R^{k-1} \in \mathbb{R}^{n \times d}$ represent inputs of a k-th global interaction layer, wherein m and n represent the number of words contained in a current turn of dialogue and the number of words contained in the candidate answer, respectively, and inputs of the first global interaction layer is $U^0 = E_u$, $R^0 = E_r$; $W_h \in \mathbb{R}^{4d \times d}$ and $b_h$ are training parameters; the operator $\odot$ represents a multiplication of elements; d represents the dimension of a vector $C \in \mathbb{R}^{l_c \times d}$ represents context obtained by cascading contents of all l turn of dialogue. All l turns of dialogues contain $l_c$ words, C can be obtained by cascading word level vectors of the $l_c$ words;

In the above formula, $f_{catt}(\ )$ represents the described global attention mechanism, which is specifically defined as follows:

$$f_{catt}(Q, K, C) = \tilde{Q} + FNN(\tilde{Q})$$

In the above formula, $FNN(\tilde{Q})=\max(0,\tilde{Q}W_f+b_f)W_g+b_g$, wherein $W_{\{f,g\}}\in \mathbb{R}^{d\times d}$ and $b_{\{f,g\}}$ are trainable parameters, Q and $\hat{Q}$ are mixed using a residual connection to obtain $\tilde{Q}$.

In this embodiment, Q and $\hat{Q}$ are mixed using a residual connection used by He et al. (For details, see He K, Zhang X, Ren S, et al. Deep Residual Learning for Image Recognition[C]; proceedings of the CVPR 2016, F, 2016.) in the present invention to obtain a new Q. In order to prevent gradient explosion or gradient disappearance, the present invention uses a layer normalization (For detail, see: Ba L J, Kiros J R, Hinton G E. Layer Normalization[J]. CoRR, 2016.).

Wherein $\hat{Q}$ is calculated according to the following formula:

$$\hat{Q}=S(Q,K,C)\cdot K$$

In the above formula, $Q\in \mathbb{R}^{n_q\times d}$ represents a query sequence, $K\in \mathbb{R}^{n_k\times d}$ represents a key sequence, wherein $n_q$ and $n_k$ represent the number of words, $S(Q,K,C)\in \mathbb{R}^{n_q\times n_k}$ represents the similarity of Q and K in the context C; $S(Q, K, C)$ is calculated according to the following formula:

$$S(Q,K,C)_{i,j} = \frac{\exp(e_{i,j})}{\sum_{k=1}^{n_k} e_{i,k}}$$

$$e_{i,j} = W_b\tanh\left(W_cQ_i + W_dK_j + W_e\frac{C_i^1 + C_j^k}{2}\right)$$

In the above formula, $W_{\{b,c,d,e\}}$ are trainable parameters, $C_i^q$ represents the i-th row of $C^q$, and its physical meaning is the fusion context information related to the i-th word in the query sequence Q; $C_j^k$ represents the j-th row of $C^k$, and its physical meaning is the fusion context information related to the j-th word of the key sequence K;

$C^q\in \mathbb{R}^{n_q\times d}$ and $C^k\in \mathbb{R}^{n_k\times d}$ represent context information compression vector fusing the query vector Q and context information compression vector fusing the key vector K, respectively, and are calculated according to the following formula:

$$C^q=\text{softmax}(QW_aC^T)\cdot C$$

$$C^k=\text{softmax}(KW_aC^T)\cdot C$$

$W_a\in \mathbb{R}^{d\times d}$ are training parameters; softmax ( ) represents a softmax function.

A convolutional neural network is used to extract a d dimension matching vector $v_i$ from a matching image $M_i$ of the i-th turn of dialogue, and the matching vector from the first to l-th turn of dialogues are represented by $(v_1, \ldots, v_l)$; the matching image $M_i$ of the i-th turn of dialogue is calculated according to the following formula:

$$M_i=M_{i,self}\oplus M_{i,interaction}\oplus M_{i,enhanced}$$

In the above formula, $M_i\in \mathbb{R}^{m_i\times n\times 3}$, $\oplus$ is a cascading operation, $m_i$ is the number of words contained in the i-th turn of dialogue $u_i$; $M_{i,self}$, $M_{i,interaction}$ and $M_{i,enhanced}$ are calculated according to the following formulas:

$$M_{i,self} = \frac{\hat{U}_i^L \cdot (\hat{R}^L)^\top}{\sqrt{d}}$$

$$M_{i,interaction} = \frac{\overline{U}_i^L \cdot (\overline{R}^L)^\top}{\sqrt{d}}$$

-continued $$M_{i,enhanced} = \frac{U_i^L \cdot (R^L)^\top}{\sqrt{d}}.$$

The aggregation module: this module is composed of one RNN network and one Transformer network, and configured to: receive the matching vector $(v_1, \ldots, v_l)$ output by the matching module, process the matching vector by the RNN network to obtain a short-term dependence information sequence $(h_1, \ldots, h_l)$, and process the matching vector by the Transformer network to obtain a long-term dependence information sequence $(g_1, \ldots, g_l)$.

In this embodiment, an encoder in Transformer (For detail, see Vaswani A, Shazeer N, Parmar N, et al. Attention is All you Need[C]; proceedings of the NIPS, F, 2017.) captures the long-term dependence information in the matching vector $(v_1, \ldots, v_l)$.

The prediction module is configured to calculate a matching score of the context c and the candidate answer r involved in matching according to the short-term dependence information sequence $(h_1, \ldots, h_l)$ and the long-term dependence information sequence $(g_1, \ldots, g_l)$ output by the aggregation module.

The word level vector described in the representation module is obtained by the tool Word2vec (see Mikolov T, Sutskever I, Chen K, et al. Distributed Representations of Words and Phrases and their Compositionality[C]; proceedings of the NIPS 2013, F, 2013.); the character level vector is obtained by encoding character information through the convolutional neural network. For the convolutional neural network used in the embodiment, see Lee K, He L, Lewis M, et al. End-to-end Neural Coreference Resolution [Z]. EMNLP. 2017.

The specific calculation process of the short-term dependence information sequence $(h_1, \ldots, h_l)$ is:

obtaining l hidden layer state vectors by processing the matching vector $(v_1, \ldots, v_l)$ through a GRU mode, wherein the i-th hidden layer state is:

$$h_i=GRU(v_i,h_{i-1})$$

where, $h_0$ is initialized randomly.

The specific calculation process of the long-term dependence information sequence $(g_1, \ldots, g_l)$ is:

$$(g_1,\ldots,g_l)=\text{MultiHead}(Q,K,V)$$

where, $$Q=V_mW^Q, K=V_mW^K, V=V_mW^V,$$

wherein $W^Q$, $W^K$ and $W^V$ are training parameters; Multihead( ) represents a multi-head attention function; $V_m=(V_1, \ldots, V_l)$.

The specific process of the prediction module to calculate the matching score of the context c and the candidate answer r involved in matching is calculated as follows:

calculating $$\hat{g}_i = \max\left(0, W\left[\begin{array}{c}(g_i - h_i)\odot(g_i - h_i)\\g_i\odot h_i\end{array}\right] + b\right)$$

to obtain $(\hat{g}_1, \ldots, \hat{g}_l)$, wherein $\odot$ represents the multiplication of elements;

then inputting $(\hat{g}_1, \ldots, \hat{g}_l)$ into a GRU model, to obtain:

$$\tilde{g}_i=GRU(\hat{g}_i,\tilde{g}_{i-1})$$

wherein $\tilde{g}_o$ is initialized randomly; the final hidden layer state of the GRU model is $\tilde{g}_1$ calculating the matching score of the context c and the candidate answer r involved in matching based on $\tilde{g}_l$:

$$g(c,r)=\sigma(\tilde{g}_l \cdot w_o + b_o)$$

In the above formula, $\sigma(\cdot)$ represents a sigmoid function, $w_o$ and $b_o$ are training parameters.

The system is trained using the following loss function:

$$L_{enhanced} = -\sum_L^{k=1} \sum_N^{i=1} \left[ y_i \log\left(g^k(c_i, r_i)\right) + (1-y_i)\log\left(1 - g^k(c_i, r_i)\right) \right]$$

where, $g^k(c_i,r_i)$ represents a matching score calculated by using the output $(\hat{U}^k, \hat{R}^k)$ of the k-th global interaction layer in the matching module for the i-th training sample $(c_i, r_i, y_i)$; $c_i$ represents a session of the i-th training sample, $r_i$ represents a candidate answer of the i-th training sample, $y_i$ represents a true matching result of the i-th training sample.

Figure 2:
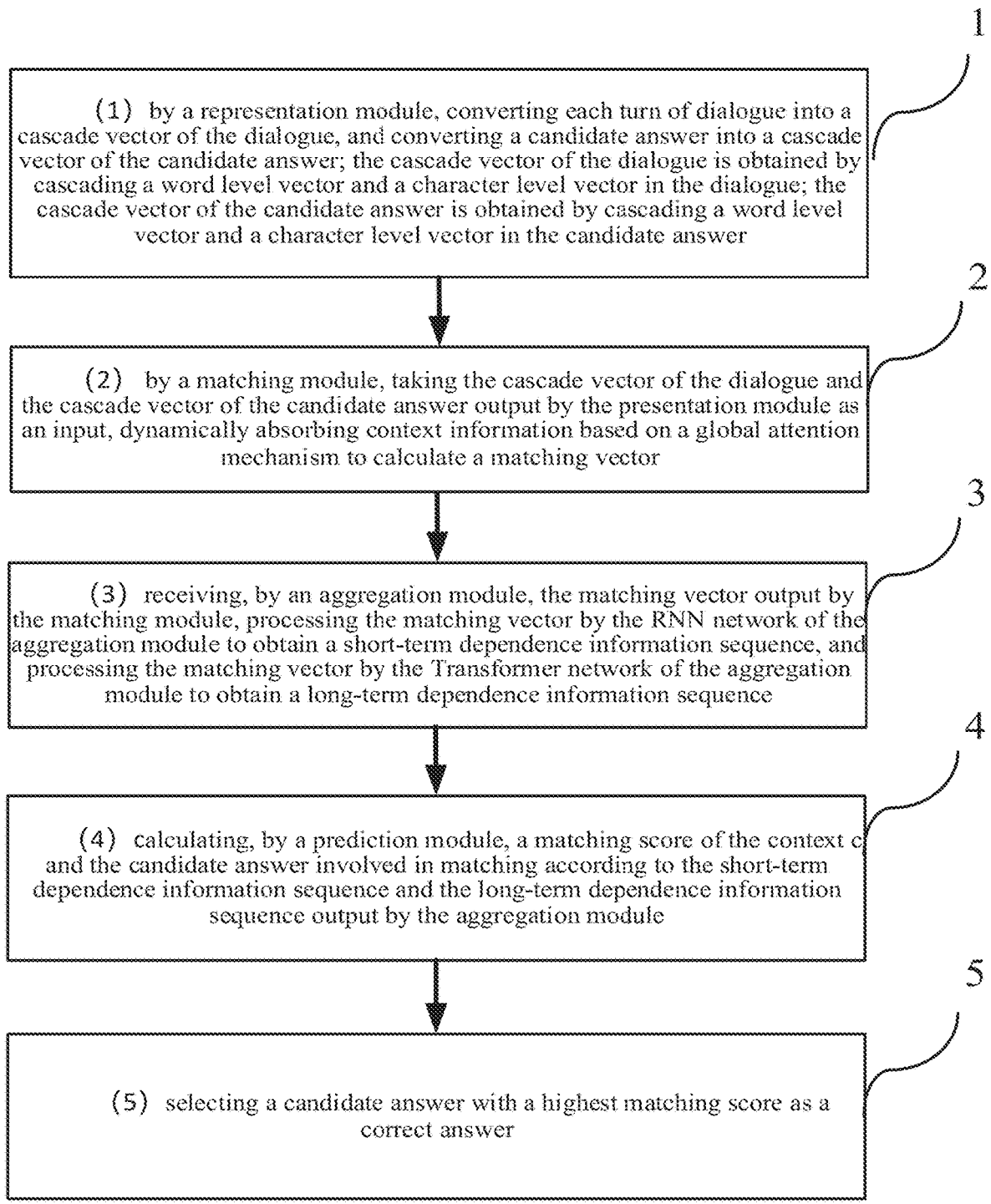
FIG. 2 is a flow diagram of a multi-turn dialogue retrieval-based method proposed by the present invention.

Referring to FIG. 2, the present invention also proposes a multi-turn dialogue method based on retrieval, comprising:

(1) by a representation module, converting each turn of dialogue into a cascade vector $E_u$ of the dialogue, and converting a candidate answer r into a cascade vector $E_r$ of the candidate answer; the cascade vector $E_u$ of the dialogue is obtained by cascading a word level vector and a character level vector in the dialogue; the cascade vector $E_r$ of the candidate answer is obtained by cascading a word level vector and a character level vector in the candidate answer; the word level vector is obtained by a tool Word2vec; the character level vector is obtained by encoding character information through a convolutional neural network;

(2) by a matching module, taking the cascade vector of the dialogue and the cascade vector of the candidate answer output by the representation module as an input, dynamically absorbing context information based on a global attention mechanism, and recursively calculating a k-th layer self-attention dialogue representation $\hat{U}^k$, a k-th layer self-attention candidate answer representation $\hat{R}^k$, a k-th layer mutual attention dialogue representation $\overline{U}^k$, a k-th mutual attention candidate answer representation $\overline{R}^k$, a k-th layer dialogue synthesis representation $U^k$, and a k-th layer candidate answer synthesis representation $R^k$, by the following formulas, to obtain a matching vector $(v_1, \ldots, v_l)$:

$$\hat{U}^k = f_{catt}(U^{k-1}, U^{k-1}, C)$$

$$\hat{R}^k = f_{catt}(R^{k-1}, R^{k-1}, C)$$

$$\overline{U}^k = f_{catt}(U^{k-1}, R^{k-1}, C)$$

$$\overline{R}^k = f_{catt}(R^{k-1}, U^{k-1}, C)$$

$$\tilde{U}^k = [U^{k-1}, \hat{U}^k, \overline{U}^k, U^{k-1} \odot \overline{U}^k]$$

$$\tilde{R}^k = [R^{k-1}, \hat{R}^k, \overline{R}^k, R^{k-1} \odot \overline{R}^k]$$

$$U^k = \max(0, W_h \tilde{U}^{k-1} + b_h)$$

$$R^k = \max(0, W_h \tilde{R}^{k-1} + b_h) + R^{k-1}$$

In the above formula, $U^{k-1} \in \mathbb{R}^{m \times d}$ and $R^{k-1} \in \mathbb{R}^{n \times d}$ represent inputs of the k-th global interaction layer, wherein m and n represent the number of words contained in the current turn of dialogue and the number of words contained in the candidate answer, respectively, and inputs of the first global interaction layer are $U^0 = E_u$, $R^0 = E_r$; $W_h \in \mathbb{R}^{4d \times d}$ and $b_h$ are training parameters; the operator $\oplus$ represents a multiplication of elements; d represents the dimension of a vector $C \in \mathbb{R}^{l_c \times d}$ represents context obtained by cascading the contents of all l turns of dialogues. All l turns of dialogues contain $l_c$ words, C can be obtained by cascading word level vectors of the $l_c$ words;

In the above formula, $f_{catt}(\ )$ represents the described global attention mechanism, which is specifically defined as follows:

$$f_{catt}(Q,K,C) = \tilde{Q} + FNN(\tilde{Q})$$

In the above formula, $FNN(\tilde{Q}) = \max(0, \tilde{Q}W_f + b_f)W_g + b_g$, wherein $W_{\{f,g\}} \in \mathbb{R}^{d \times d}$ and $b_{\{f,g\}}$ are trainable parameters, Q and $\hat{Q}$ are mixed using a residual connection to obtain $\tilde{Q}$, wherein $\hat{Q}$ is calculated according to the following formula:

$$\hat{Q} = S(Q,K,C) \cdot K$$

In the above formula, $Q \in \mathbb{R}^{n_q \times d}$ represents a query sequence, $K \in \mathbb{R}^{n_k \times d}$ represents a key sequence, wherein $n_q$ and $n_k$ represent the number of words, $S(Q,K,C) \in \mathbb{R}^{n_q \times n_k}$ represents the similarity of Q and K in the context C; $S(Q, K, C)$ is calculated according to the following formula:

$$S(Q, K, C)_{i,j} = \frac{\exp(e_{i,j})}{\sum_{k=1}^{n_k} e_{i,k}}$$

$$e_{i,j} = W_b \tanh\left(W_c Q_i + W_d K_j + W_e \frac{C_i^q + C_j^k}{2}\right)$$

In the above formula, $W_{\{b,c,d,e\}}$ are trainable parameters, $C_i^q$ represents the i-th row of $C^q$, and its physical meaning is the fusion context information related to the i-th word in the query sequence Q; $C_j^k$ represents the j-th row of $C^k$, and its physical meaning is the fusion context information related to the j-th word of a key sequence K;

$C^q \in \mathbb{R}^{n_q \times d}$ and $C^k \in \mathbb{R}^{n_k \times d}$ represent context information compression vector fusing the query vector Q and context information compression vector fusing the key vector K, respectively, and they are calculated according to the following formulas:

$$C^q = \text{softmax}(QW_a C^T) \cdot C$$

$$C^k = \text{softmax}(KW_a C^T) \cdot C$$

$W_a \in \mathbb{R}^{d \times d}$ are training parameters; and extracting a d dimension matching vector $v_i$ from a matching image $M_i$ of the i-th turn of dialogue by a convolutional neural network, and the matching vectors from the first to the l-th turn of dialogues are represented by $(v_1, \ldots, v_l)$; the matching image $M_i$ of the i-th turn of dialogue is calculated according to the following formula:

$$M_i = M_{i,self} \oplus M_{i,interaction} \oplus M_{i,enhanced}$$

In the above formula, $M_i \in \mathbb{R}^{m_i \times n \times 3}$, $\oplus$ is a cascading operation, $m_i$ is the number of words contained in the i-th turn of dialogue $u_i$; $M_{i,self}$, $M_{i,interaction}$ and $M_{i,enhanced}$ are calculated according to the following formulas:

$$M_{i,self} = \frac{\hat{U}_i^L \cdot (\hat{R}^L)^T}{\sqrt{d}}$$

-continued $$M_{i,interaction} = \frac{\overline{U}_i^L \cdot (\overline{R}^L)^\top}{\sqrt{d}}$$

$$M_{i,enhanced} = \frac{U_i^L \cdot (R^L)^\top}{\sqrt{d}}.$$

(3) receiving, by an aggregation module, the matching vector $(v_1, \ldots, v_l)$ output by the matching module, processing the matching vector by the RNN network of the aggregation module to obtain a short-term dependence information sequence $(h_1, \ldots, h_l)$, and processing the matching vector by the Transformer network of the aggregation module to obtain a long-term dependence information sequence $(g_1, \ldots, g_l)$;

The specific calculation process of the short-term dependence information sequence $(h_1, \ldots, h_l)$ is:

obtaining l hidden layer state vectors by processing the matching vector $(v_1, \ldots, v_l)$ through a GRU model, wherein the i-th hidden layer state is:

$$h_i = GRU(v_i, h_{i-1})$$

where, $h_0$ is initialized randomly.

The specific calculation process of the long-term dependence information sequence $(g_1, \ldots, g_l)$ is:

$$(g_1, \ldots, g_l) = \text{MultiHead}(Q, K, V)$$

In the above formula, $$Q = V_m W^Q, K = V_m W^K, V = V_m W^V,$$

wherein $W^Q$, $W^K$ and $W^V$ are training parameters; Multihead ( ) represents a multi-head attention function; $V_m = (v_1, \ldots, v_l)$.

(4) calculating, by a prediction module, a matching score of the context c and the candidate answer involved in matching according to the short-term dependence information sequence $(h_1, \ldots, h_l)$ and the long-term dependence information sequence $(g_1, \ldots, g_l)$ output by the aggregation module, wherein the calculating includes:

calculating $$\hat{g}_i = \max\left(0, W\left[\frac{(g_i - h_i) \odot (g_i - h_i)}{g_i \odot h_i}\right] + b\right)$$

to obtain $(\hat{g}_1, \ldots, \hat{g}_l)$, wherein $\oplus$ represents the multiplication of elements;

then inputting $(\hat{g}_1, \ldots, \hat{g}_l)$ into a GRU model, to obtain:

$$\tilde{g}_i = GRU(\hat{g}_i, \tilde{g}_{i-1})$$

wherein $\tilde{g}_0$ is initialized randomly; a final hidden layer state of the GRU model is $\tilde{g}_l$;

calculating the matching score of the context c and the candidate answer r involved in matching based on $\tilde{g}_l$:

$$g(c, r) = \sigma(\tilde{g}_l^\top w_o + b_o)$$

In the above formula, $\sigma(\cdot)$ represents a sigmoid function, $w_o$ and $b_o$ are training parameters.

(5) Selecting a candidate answer with the highest matching score as a correct answer.

The inventor has conducted a lot of experiments on the proposed system and method on three widely used multi-turn dialogue retrieval data sets. The three data sets are Ubuntu dialogue data sets (see Lowe R, Pow N, Serban I, et al. The Ubuntu Dialogue Corpus: A Large Dataset for Research in Unstructured Multi-Turn Dialogue Systems[C]; proceedings of the SIGDIAL 2015, F, 2015.), Douban Dialog Data sets (see Wu Y, Wu W, Xing C, et al. Sequential Matching Network: A New Architecture for Multi-turn Response Selection in Retrieval-Based Chatbots[C]; proceedings of the Proceedings of the 55th Annual Meeting of the Association for Computational Linguistics, ACL 2017, Vancouver, Canada, July 30-August 4, Volume 1: Long Papers, F, 2017. Association for Computational Linguistics.), and E-commerce dialogue data sets (see Zhang Z, Li J, Zhu P, et al. Modeling Multi-turn Conversation with Deep Utterance Aggregation[C]; proceedings of the COLING, F, 2018.). The statistical information of these data sets are shown in Table 1.

TABLE 1 statistical information of three multiple turn dialogue data sets

| Data set | Ubuntu | | | Douban | | | E-commerce | | |
| --- | --- | --- | --- | --- | --- | --- | --- | --- | --- |
| | Train | Valid | Test | Train | Valid | Test | Train | Valid | Test |
| Number of dialogue-candidate answer pairs | 1M | 500K | 500K | 1M | 50K | 50K | 1M | 10K | 10K |
| Number of candidate answers | 2 | 10 | 10 | 2 | 2 | 10 | 2 | 2 | 10 |
| Average number of turns of dialogues | 10.13 | 10.11 | 10.11 | 6.69 | 6.75 | 6.45 | 5.51 | 5.48 | 5.64 |
| Average number of words per turn of dialogue | 11.35 | 11.34 | 11.37 | 18.56 | 18.50 | 20.74 | 7.02 | 6.99 | 7.11 |

In the experiment, the word level vector of English text is a 200 dimensional word vector obtained by word2vec, and the character level vector of English text is a 100 dimensional vector; The experimental results show that the method proposed by the present invention is effective and feasible, and the indicators are obviously superior to other methods.

What is claimed is:

1. A computer-implemented multi-turn dialogue method based on retrieval, comprising:

(1) converting each turn of dialogue into a cascade vector $E_u$ of the dialogue, and converting a candidate answer r into a cascade vector $E_r$ of the candidate answer; the cascade vector $E_u$ of the dialogue is obtained by cascading a word level vector and a character level vector in the dialogue; the cascade vector $E_r$ of the candidate answer is obtained by cascading a word level vector and a character level vector in the candidate answer; the word level vector is obtained by a tool Word2vec; the character level vector is obtained by encoding character information through a convolutional neural network;

(2) taking the cascade vector of the dialogue and the cascade vector of the candidate answer as an input, dynamically absorbing context information based on a global attention mechanism, and recursively calculating a k-th layer self-attention dialogue representation $\hat{U}^k$, a k-th layer self-attention candidate answer representation $\hat{R}^k$, a k-th layer mutual attention dialogue representation $\overline{U}^k$, a k-th layer mutual attention candidate answer representation $\overline{R}^k$, a k-th layer dialogue synthesis representation $\tilde{U}^k$, and a k-th layer candidate answer synthesis representation $\tilde{R}^k$, by the following formulas, to obtain a matching vector $(v_1, \ldots, v_l)$:

$$\hat{U}^k = f_{catt}(U^{k-1}, U^{k-1}, C)$$

$$\hat{R}^k = f_{catt}(R^{k-1}, R^{k-1}, C)$$

$$\overline{U}^k = f_{catt}(U^{k-1}, R^{k-1}, C)$$

$$\overline{R}^k = f_{catt}(R^{k-1}, U^{k-1}, C)$$

$$\tilde{U}^k = [U^{k-1}, \hat{U}^k, \overline{U}^k, U^{k-1} \odot \overline{U}^k]$$

$$\tilde{R}^k = [R^{k-1}, \hat{R}^k, \overline{R}^k, R^{k-1} \odot \overline{R}^k]$$

$$U^k = \max(0, W_h \tilde{U}^{k-1} + b_h) + U^{k-1}$$

$$R^k = \max(0, W_h \tilde{R}^{k-1} + b_h) + R^{k-1}$$

in the formulas, $U^{k-1} \in \mathbb{R}^{m \times d}$ and $R^{k-1} \in \mathbb{R}^{n \times d}$ represent inputs of a k-th global interaction layer, wherein m and n represent the number of words contained in a current turn of dialogue and the number of words contained in the candidate answer, respectively, and inputs of a first global interaction layer are $U^0 = E_u$, $R^0 = E^r$; $W_h \in \mathbb{R}^{4d \times d}$ and $b_h$ are training parameters; an operator $\odot$ represents a multiplication of elements; d represents a dimension of a vector;

$C \in \mathbb{R}^{l_c \times d}$ represents context obtained by cascading contents of all l turns of dialogues; all l turns of dialogues contain $l_c$ words, C can be obtained by cascading word level vectors of the $l_c$ words;

in the formulas, $f_{catt}(\ )$ represents the global attention mechanism, which is specifically defined as follows:

$$f_{catt}(Q, K, C) = \hat{Q} + FNN(\hat{Q})$$

where, $FNN(\tilde{Q}) = \max(0, \tilde{Q}W_f + b_f)W_g + b_g$, wherein $W_{\{f,g\}} \in \mathbb{R}^{d \times d}$ and $b_{\{f,g\}}$ are trainable parameters, Q and $\hat{Q}$ are mixed using a residual connection to obtain $\tilde{Q}$, wherein $\hat{Q}$ is calculated according to the following formula:

$$\hat{Q} = S(Q, K, C) \cdot K$$

where, $Q \in \mathbb{R}^{n_q \times d}$ represents a query sequence, $K \in \mathbb{R}^{n_k \times d}$ represents a key sequence, wherein $n_q$ and $n_k$ represent the number of words, $S(Q, K, C) \in \mathbb{R}^{n_q \times n_k}$ represents a similarity of Q and K in the context C; S(Q, K, C) is calculated according to the following formula:

$$S(Q, K, C)_{i,j} = \frac{\exp(e_{i,j})}{\sum_{k=1}^{n_k} e_{i,k}}$$

$$e_{i,j} = W_b \tanh\left(W_c Q_i + W_d K_j + W_e \frac{C_i^q + C_j^k}{2}\right)$$

where, $W_{\{b,c,d,e\}}$ are trainable parameters, $C_i^q$ represents an i-th row of $C^q$, and its physical meaning is fusion context information related to an i-th word in the query sequence Q; $C_j^k$ represents a j-th row of $C^k$, and its physical meaning is fusion context information related to a j-th word of the key sequence K;

$C^q \in \mathbb{R}^{n_q \times d}$ and $C^k \in \mathbb{R}^{n_k \times d}$ represent context information compression vector fusing the query vector Q and context information compression vector fusing the key vector K, respectively, and are calculated according to the following formulas:

$$C^q = \text{softmax}(QW_a C^T) \cdot C$$

$$C^k = \text{softmax}(KW_a C^T) \cdot C$$

$W_a \in \mathbb{R}^{d \times d}$ are training parameters; and extracting a d dimension matching vector $v_i$ from a matching image $M_i$ of an i-th turn of dialogue by a convolutional neural network, and matching vectors from the first to l-th turn of dialogues are represented by $(v_1, \ldots, v_l)$; the matching image $M_i$ of the i-th turn of dialogue is calculated according to the following formula:

$$M_i = M_{i,self} \oplus M_{i,interaction} \oplus M_{i,enhanced}$$

where, $M_i \in \mathbb{R}^{mi \times n \times 3}$, $\oplus$ is a cascading operation, mi is the number of words contained in the i-th turn of dialogue $u_i$; $M_{i,self}$, $M_{i,interaction}$ and $M_{i,enhanced}$ are calculated according to the following formulas:

$$M_{i,self} = \frac{\hat{U}_i^L \cdot (\hat{R}^L)^\top}{\sqrt{d}}$$

$$M_{i,interaction} = \frac{\overline{U}_i^L \cdot (\overline{R}^L)^\top}{\sqrt{d}}$$

$$M_{i,enhanced} = \frac{U_i^L \cdot (R^L)^\top}{\sqrt{d}};$$

(3) receiving the matching vector $(v_1, \ldots, v_l)$, processing the matching vector by an RNN network to obtain a short-term dependence information sequence $(h_1, \ldots, h_l)$, and processing the matching vector by a Transformer network to obtain a long-term dependence information sequence $(g_1, \ldots, g_l)$;

wherein a specific calculation process of the short-term dependence information sequence $(h_1, \ldots, h_l)$ is:

obtaining/hidden layer state vectors by processing the matching vector $(v_1, \ldots, v_l)$ through a GRU model, wherein an i-th hidden layer state is:

$$h_l = GRU(v_l, h_{l-1})$$

where, $h_0$ is initialized randomly;

a specific calculation process of the long-term dependence information sequence $(g_1, \ldots, g_l)$ is:

$$(g_1, \ldots, g_l) = \text{MultiHead}(Q, K, V)$$

where, $$Q = V_m W^Q, K = V_m W^K, V = V_m W^V,$$

where $W^Q$, $W^K$ and $W^V$ are training parameters; Multihead ( ) represents a multi-head attention function; $V_m = (v_1, \ldots, v_l)$;

(4) calculating a matching score of the context c and the candidate answer involved in matching according to the short-term dependence information sequence $(h_1, \ldots, h_l)$ and the long-term dependence information sequence $(g_1, \ldots, g_l)$, wherein the calculating includes:

calculating $$\hat{g}_i = \max\left(0, W\begin{bmatrix}(g_i - h_i) \odot (g_i - h_i)\\ g_i \odot h_i\end{bmatrix} + b\right)$$

to obtain $(\hat{g}_1, \ldots, \tilde{g}_l)$, wherein $\oplus$ represents the multiplication of elements;

then inputting $(\hat{g}_1, \ldots, \hat{g}_l)$ into a GRU model, to obtain:

$$\tilde{g}_i = GRU(\hat{g}_i, \tilde{g}_{i-1})$$

wherein $\tilde{g}_0$ is initialized randomly; a final hidden layer state of the GRU model is $\tilde{g}_l$;

calculating the matching score of the context c and the candidate answer r involved in matching based on $\tilde{g}_l$:

$$g(c,r) = \sigma(\tilde{g}_l \cdot w_o + b_o)$$

where, $\sigma(\cdot)$ represents a sigmoid function, $w_o$ and $b_o$ are training parameters, (5) selecting a candidate answer with a highest matching score as a correct answer.

* * * * *